United States Patent

Surauer et al.

[11] Patent Number: 5,984,238
[45] Date of Patent: Nov. 16, 1999

[54] METHOD AND SYSTEM FOR THE AUTONOMOUS ON-BOARD DETERMINATION OF THE POSITION OF A SATELLITE

[75] Inventors: Michael Surauer, Chieming; Walter Fichter; Oliver Juckenhoefel, both of Munich, all of Germany

[73] Assignee: Diamler-Benz Aerospace AG, Germany

[21] Appl. No.: 09/016,947

[22] Filed: Feb. 2, 1998

[30] Foreign Application Priority Data

Jan. 31, 1907 [DE] Germany .......................... 197 03 629

[51] Int. Cl.[6] ........................................ B64G 1/36
[52] U.S. Cl. .......................... 244/171; 244/164; 244/176
[58] Field of Search .................... 244/176, 171, 244/164, 158 R

[56] References Cited

U.S. PATENT DOCUMENTS

| | | | |
|---|---|---|---|
| 5,108,050 | 4/1992 | Maute | 244/171 |
| 5,311,435 | 5/1994 | Yocum et al. | 244/176 |
| 5,452,869 | 9/1995 | Basuthakur et al. | 244/176 |
| 5,528,502 | 6/1996 | Wertz | 244/164 |
| 5,546,309 | 8/1996 | Johnson et al. | 244/171 |
| 5,865,402 | 2/1999 | Fischer et al. | 244/171 |

*Primary Examiner*—J. Woodrow Eldred
*Attorney, Agent, or Firm*—Evenson, McKeown, Edwards & Lenahan, P.L.L.C.

[57] ABSTRACT

A system for autonomous on-board determination of the position of an earth orbiting satellite consists of a biaxially measuring earth sensor which defines the z-axis (yaw axis) of the satellite and of several biaxially measuring sun sensor measuring heads which are arranged on the satellite structure such that, with the exception of earth shadow phases, they supply a direction vector measurement. Out-of-plane movement of the satellite is propagated by means of a precise model of the satellite dynamics including natural disturbance forces and thrusts during maneuvers on board. In order to compensate sensor uncertainties and the effects of thermal deformations, the satellite orbit is precisely measured at regular intervals (approximately 3 months), and by means of this information, a calibration function (time function for a day) for compensating measured values is determined. The in-plane movement of the satellite is not only propagated, but the propagation is supported by measured data (estimation), and the effects of out-of-plane movement and thermal deformations are taken into account, by means of the data of the calibration function ($k(t)$) or of the propagation out-of-plane movement.

4 Claims, 3 Drawing Sheets

METHOD AND SYSTEM FOR THE AUTONOMOUS ON-BOARD DETERMINATION OF THE POSITION OF A SATELLITE

BACKGROUND AND SUMMARY OF THE INVENTION

This application claims the priority of German patent document 197 03 629.5, the disclosure of which is expressly incorporated by reference herein.

The present invention relates to a method for autonomous on-board determination of the position of an earth orbitting satellite.

In prior art systems of this type, the determination and holding of the position of a satellite normally does not take place automatically and autonomously. That is, an earth station determines the deviation of the actual orbit from the desired orbit, and corresponding correction maneuvers are then manually commanded from earth.

To save cost, it may be advantageous to carry out the tasks of "orbit determination" and "orbit correction" autonomously on board; that is, without the intervention of an earth station. The results of investigations of different methods for the board-side determination of orbit parameters and their correction largely independently of interventions of the earth station are described in P. Maute et al., "Autonomous Geostationary Station Keeping System Optimization and Validation", IAF-88-327,39. Congress of the International Astronautical Federation, 1988, Bangalore, India and J. Potti et al., "On-Board Autonomous Station Keeping (OBASK) Executive Summary, ESTEC Contract No. 9675/91/NL/JG GMVSA 2064/93, GMV S.A. 1993. However, in addition to measuring equipment which is already available on board such craft for the purpose of controlling the attitude (particularly earth and sun sensors), most systems of this type require additional measured-value generators which are used solely, or at least predominantly, for the purpose of determining orbit parameters. Particularly, the use of additional star sensors was found advantageous for this purpose.

One exception is indicated in K.D. Mease, et al., "An Approach to Autonomous On-Board Orbit Determination", The Journal of the Astronautical Sciences, Vol. 33, No. 2, pp 163–178, 1985, which indicates that the satellite orbit can be determined in a complete manner by means of a biaxially measuring earth sensor, a two-axis sun sensor and a Kalman filter. The sun sensor is mounted on the drive of the solar generator so that, in the case of the known position of the drive, the sensor measurements can be transformed into the system of body coordinates.

The known methods and systems for the autonomous orbit determination suffer from the following deficiencies:

The installation of additional measuring instruments, particularly star sensors, results in additional costs, weight and complexity of the measuring system.

In the case of a polaris sensor, system-technical difficulties occur because, as the result of sun reflections, light scatter shields must be mounted on the solar generators which also result in additional weight.

The use of a sun sensor mounted on the drive of the solar generator requires that the angular position of the driving motor with respect to the satellite be known precisely in order to transform the measuring information into the body-fixed satellite system. However, in the case of conventional driving motors (stepper motors), this generally cannot be ensured with sufficient precision.

It can be demonstrated that the complete orbit information cannot be determined by means of a respective biaxial earth and sun sensor measurement.

It is therefore an object of the present invention to determine the orbit (position) of a satellite as far as possible autonomously on board the spacecraft, by using normally existing sensors (biaxially measuring earth and sun sensors), in order to facilitate optimal correction maneuvers by means of this orbit information.

In the following, it is assumed that the earth and sun sensors supply direction vectors of length I in the direction of the center of the earth and in the direction of the sun, respectively. Sensor errors, installation errors of the sensors, and relative position errors of the sensors because of thermal deformations of the satellite structure interfere with the directional measurements. The object of the invention therefore also includes the provision of methods for identifying and eliminating such error influences.

These and other objects and advantages are achieved by the process and apparatus according to the invention, which is characterized by the following features:

1. The system consists of a biaxially measuring earth sensor which defines the z-axis (yaw axis) of the satellite and of several biaxially measuring sun sensor measuring heads which are arranged on the satellite structure such that, with the exception of earth shadow phases, they supply a direction vector measurement.
2. The out-of-plane movement of the satellite is propagated by means of a precise on-board model of the satellite dynamics including natural disturbance forces and thrusts during maneuvers.
3. In order to compensate sensor uncertainties and influences of thermal deformations, the satellite orbit is precisely measured at regular intervals (approximately 3 months). By means of this information, a calibration function (time function for a day) is determined by means of which the measured values are compensated.
4. The in-plane movement is not only propagated but the propagation is supported by measured data (estimation), and the effects of out-of-plane movement and thermal deformations are taken into account, by means of the data of the calibration function (k(t) or of the propagated out-of-plane movement.
5. It is possible for the earth station to switch off the automatic and autonomous orbit determination and position holding as soon as larger deviations occur during the autonomous operating phase between the position computed autonomously on-board and the position (passively) monitored by the earth station.

Other objects, advantages and novel features of the present invention will become apparent from the following detailed description of the invention when considered in conjunction with the accompanying drawings.

DETAILED DESCRIPTION OF THE DRAWINGS

I. First Embodiment

Orbital Movement of the Satellite

The technical requirements for position holding precision of geosynchronous satellites dictate that deviations from the desired position in the East/West direction and the North/South direction must not exceed values of ±0.05 deg. to ±0.1 deg. Because of these small deviations, the orbital movement can be linearized with good precision relative to the ideal geostationary orbit; that is, the relative movement with respect to this orbit is illustrated.

Figure 1:
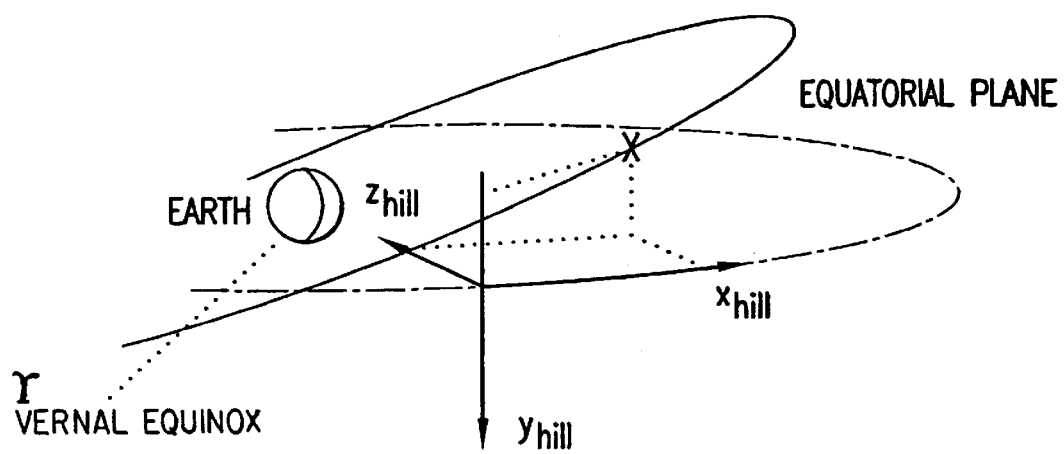
FIG. 1 is a schematic diagram that shows the system of coordinates used as the basis for calculating certain orbital equations.

The applicable movement equations, known as Hill equations, are well known and are described in the literature. The homogeneous (undisturbed) system is given by $$\ddot{x}_{hill} - 2n\dot{z}_{hill} = 0$$
$$\ddot{y}_{hill} + n^2 y_{hill} = 0 \quad (1.1)$$
$$\ddot{z}_{hill} + 2n\dot{x}_{hill} - 3n^2 z_{hill} = 0$$

wherein the system of coordinates according to FIG. 1 is used as the basis, and n is the orbiting speed of the satellite. The x-axis points in the flight direction; the y-axis is situated parallel to the orbital spin vector (with the opposite orientation); and the z-axis points to the center of the earth.

For a representation with respect to small deviations $\lambda_{hill}$ (longitudinal deviation), $\beta_{hill}$ (latitudinal deviation), and $r_{hill}$ (radial deviation), the following approximation can be used:

$$\lambda_{hill} = \lambda - \lambda_{nom} \approx \frac{x_{hill}}{a_{geo}} \quad (1.2)$$
$$\beta_{hill} = \beta_{nom} - \beta \approx \frac{y_{hill}}{a_{geo}}$$
$$r_{hill} = \frac{a_{geo} - r}{a_{geo}} \approx \frac{z_{hill}}{a_{geo}}$$

wherein $a_{geo}$ indicates the radius of the ideal geostationary orbit. This results in the undisturbed system:

$$\ddot{\lambda}_{hill} - 2n\dot{r}_{hill} = 0$$
$$\ddot{\beta}_{hill} + n^2 \beta_{hill} = 0$$
$$\ddot{r}_{hill} + 2n\dot{\lambda}_{hill} - 3n^2 r_{hill} = 0 \quad (1.3)$$

By means of the linearization, the in-plane and the out-of-plane movement are decoupled and can therefore be treated separately. Since all coefficients are constant, the dynamics of the undisturbed system are time-invariant. Disturbances in this system are modelled as inhomogeneous proportions. The following inhomogeneous differential equation system will then be obtained as the model for the orbital movement:

$$\ddot{\lambda}_{hill} - 2n\dot{r}_{hill} = \frac{f_x}{ma_{geo}} \quad (1.4)$$
$$\ddot{\beta}_{hill} + n^2 \beta_{hill} = \frac{f_y}{ma_{geo}}$$
$$\ddot{r}_{hill} + 2n\dot{\lambda}_{hill} - 3n^2 r_{hill} = \frac{f_z}{ma_{geo}}$$

where m=satellite mass.

The differential equations of the second order may be described by means of the usual state space representation:

$$\dot{\bar{x}}_{hill} = A\bar{x}_{hill} + B\bar{u} \quad (1.5)$$

By virtue of the decoupling of the North-South movement (out-of-plane) from the East-West movement (in-plane), the following arrangement of the position and speed coordinates is obtained in the state vector x:

$$\bar{x}_{hill} = (\beta_{hill} \dot{\beta}_{hill} \lambda_{hill} r_{hill} \dot{\lambda}_{hill} \dot{r}_{hill})^T \quad (1.6)$$

The dynamics matrix A and the input matrix B have the following pattern:

$$A = \begin{pmatrix} 0 & 1 & 0 & 0 & 0 & 0 \\ -n^2 & 0 & 0 & 0 & 0 & 0 \\ 0 & 0 & 0 & 0 & 1 & 0 \\ 0 & 0 & 0 & 0 & 0 & 1 \\ 0 & 0 & 0 & 0 & 0 & 2n \\ 0 & 0 & 0 & 3n^2 & -2n & 0 \end{pmatrix} \quad B = \begin{pmatrix} 0 & 0 & 0 \\ 0 & 1 & 0 \\ 0 & 0 & 0 \\ 0 & 0 & 0 \\ 1 & 0 & 0 \\ 0 & 0 & 1 \end{pmatrix} \quad (1.7)$$

The vector u is also called the input vector; it contains the inhomogeneous disturbance terms (natural disturbance accelerations and maneuver accelerations of the system):

$$\bar{u} = \left( \frac{f_x}{ma_{geo}} \quad \frac{f_y}{ma_{geo}} \quad \frac{f_z}{ma_{geo}} \right)^T \quad (1.8)$$

The dynamics of the North-South movement correspond to that of an oscillator of the second order with the natural frequency n (complex pole pair on the imaginary axis of the Laplace plane). The East-West dynamics contain additional integral proportions (double pole in the origin of the Laplace plane). This means that, also in the case of small errors in the initial condition, the errors increase with respect to the time in the case of a pure propagation.

Movement of the Sun

The inertial sun direction can be considered inertially constant for one orbit (in the case of geosynchronous satellites, therefore one day) in a good approximation. The following applies:

$$s_{rx} = -\sqrt{1 - s_{ry}^2} \sin(n(t - t_{s0})) \quad (1.9)$$
$$s_{ry} = \text{const.} \quad (1.10)$$

wherein tso is the point in time at which the satellite is in the sun direction; $\alpha = \alpha_s$ (viewed from the earth).

The sun vector component $S_{sy}$ changes with the seasons between −sin(23.4 deg) and +sin(23.4 deg).

Instruments and Measurements

Conventionally, two sensors are available on an artificial earth satellite:

A biaxially measuring earth sensor, which is aligned along the satellite z-axis and furnishes information concerning roll and pitch angles ($\Phi$, $\theta$) of the satellite.

A biaxial sun sensor consisting of several sensor heads which are mounted in the satellite x/z plane such that, except in the earth's shadow, during the whole nominal operating time of the satellite, the direction of the sun can be measured in the form of a unit vector $S_b$.

In addition, an on-board computer is available for carrying out the processes described below, as well as a precise on-board clock.

Figure 2:
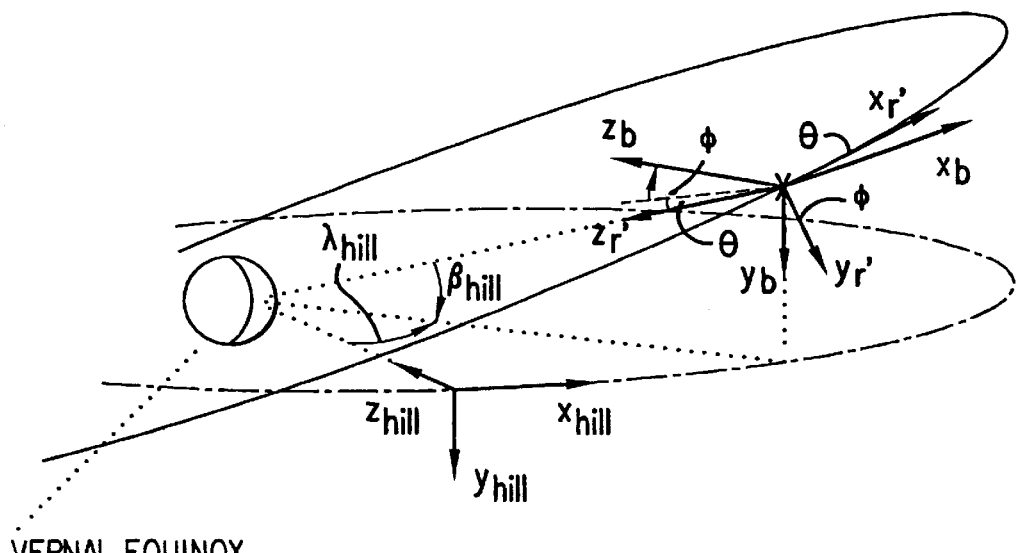
FIG. 2 shows the orientation of the axes of satellite-fixed and orbit-fixed coordinate systems used to determine a measuring equation.

For determining the measuring equation, in addition to the above-introduced reference system, two additional systems of coordinates are defined: A satellite-fixed (and therefore attitude-dependent) system with its origin in the momentary position of the satellite, and an orbit-fixed system whose origin is also in the momentary satellite position. The orientation of the axes is illustrated in FIG. 2.

In the case of an ideally attitude-controlled and orbit-controlled satellite, these systems of coordinates coincide with the reference system. In the case of only small deviations of the attitude and position from the desired condition, the following relationships apply to the representation of an arbitrary direction vector in the three systems:

$$\bar{s}_b = (E - \tilde{\phi})\bar{s}_r \quad (1.11)$$

$$\bar{s}_{r_I} = (E + \tilde{e}_x \beta_{hill} + \tilde{e}_y \lambda_{hill})\bar{s}_r \quad (1.12)$$

where:

$\bar{s}_b$: sun vector measured in the body-fixed system;
$\bar{s}_{r_I}$: sun vector in the ideally attitude-controlled system;
$\bar{s}_r$: sun vector in the reference system;
$\bar{\phi} = (\Phi \theta \psi)^T$ attitude vector (roll, pitch, yaw angle); and $$e_x = (100)^T, \ e_y = (010)^T$$

The symbol '~' indicates a cross product matrix.

If it is taken into account that, from the measurement of the earth sensor, information is present concerning the roll angle $\Phi$ and the pitch angle $\theta$ of the satellite and the equation is correspondingly split into known and unknown portions, the following result is obtained:

$$\underbrace{\bar{s}_b - (E - \tilde{\phi}_{12})\bar{s}_r}_{\text{measurable}} = \underbrace{(\tilde{e}_x \beta_{hill} + \tilde{e}_y \lambda_{hill} - \tilde{e}_z \psi)\bar{s}_r}_{\text{unknown}} \quad (1.13)$$

with $$\tilde{\phi}_{12} = \tilde{\phi} - \tilde{e}_z \psi$$

measurement of the earth sensor

By means of a few conversions, it can be verified that equation (1.13) corresponds to a system consisting of two equations, with three unknowns ($\lambda_{hill}$, $\beta_{hill}$, $\psi$) and therefore cannot be solved.

In order to eliminate the unknown yaw attitude angle v from (1.13), the equation is multiplied from the left by the unit vector $\bar{e}_z^T$. The result is the third line of the equation (1.13); that is, a scalar equation as a function of the quantities $\lambda_{hill}$ and $\beta_{hill}$:

$$y = \bar{e}_z^T [\bar{s}_b - (E - \tilde{\phi}_{12})\bar{s}_r] = (e_z^T \tilde{e}_x \bar{s}_r \ e_z^T \tilde{e}_y \bar{s}_r)\begin{pmatrix} \beta_{hill} \\ \lambda_{hill} \end{pmatrix} \quad (1.14)$$

It can be shown that this measurement corresponds to the following expression, excluding second order effects:

$$y = \bar{e}_b^T \bar{s}_b - \bar{e}_r^T \bar{s}_r \quad (1.15)$$

$$= \cos\gamma - \cos\gamma_0$$

with $\gamma$: angle between sun direction and earth direction
$\gamma_0$: reference angle at 0 attitude deviation.

The measurement quantity y therefore corresponds to the difference of the nominal and the actual angle between the sun and the earth direction, and is therefore no longer dependent on the attitude of the satellite. (Compare Mease et al).

If the equation (1.14) is now shown as a function of the components of the sun vector in the orbit-fixed reference system, the following will apply:

$$y = \underbrace{(s_{ry} \ 0 \ -s_{rx}(t) \ 0 \ 0 \ 0)}_{\bar{c}^T} \bar{x}_{hill} \quad (1.16)$$

By means of the median expression in equation (1.14), the measurement quantity y is calculated. The values of $s_b$ and $\phi_{12}$ are supplied by the sensors; the components of $s_r$ can easily be calculated on board the satellite because the sun movement is known (model in the on-board computer) and an on-board clock is available.

Orbit Estimation

The measurement quantity y contains information concerning the out-of-plane movement as well as of the in-plane movement. However, this information is not mutually independent. If, for example, the satellite is in a geosynchronous orbit, but displaced from the desired position by a constant error $\Delta\lambda$, this error is expressed in the measurement quantity by a sinusoidal vibration with the orbit frequency since $s_{rx}(t)$ has this course. If an out-of-plane deviation is simultaneously present (also sinusoidal with an orbit frequency), the measurement quantity y is again a sinusoidal vibration with the orbit frequency. Both orbit movements (the out-of-plane movement and the in-plane movement) therefore have the same effect on the measurement. In other words, the whole system (in-plane and out-of-plane movement) cannot be observed with the given measuring configuration. When only the measurement quantity is known, no conclusion can be drawn on the courses of the in-plane and out-of-plane movement. This fact can also be illustrated in a strictly mathematical manner. However, a partial system, that is, either the in-plane movement or the out-of-plane movement can be observed in the knowledge of the state of the respective other movement.

Within the scope of this invention, only the in-plane movement is observed; that is, is supported by measuring data. The out-of-pane movement is propagated. This division is carried out for two reasons: First, the in-plane movement is more difficult to propagate than the out-of-plane movement, because initial drift errors lead to errors in longitude, which increase in time. Second, in the case of geosynchronous satellites, the external force of the out-of-plane movement is essentially the result of the gravitational force of the sun and the moon, which is relatively precisely known. In the case of the in-plane movement, the dominant influence of force is given by the solar pressure. This is known in a relatively inaccurate manner.

Figure 3:
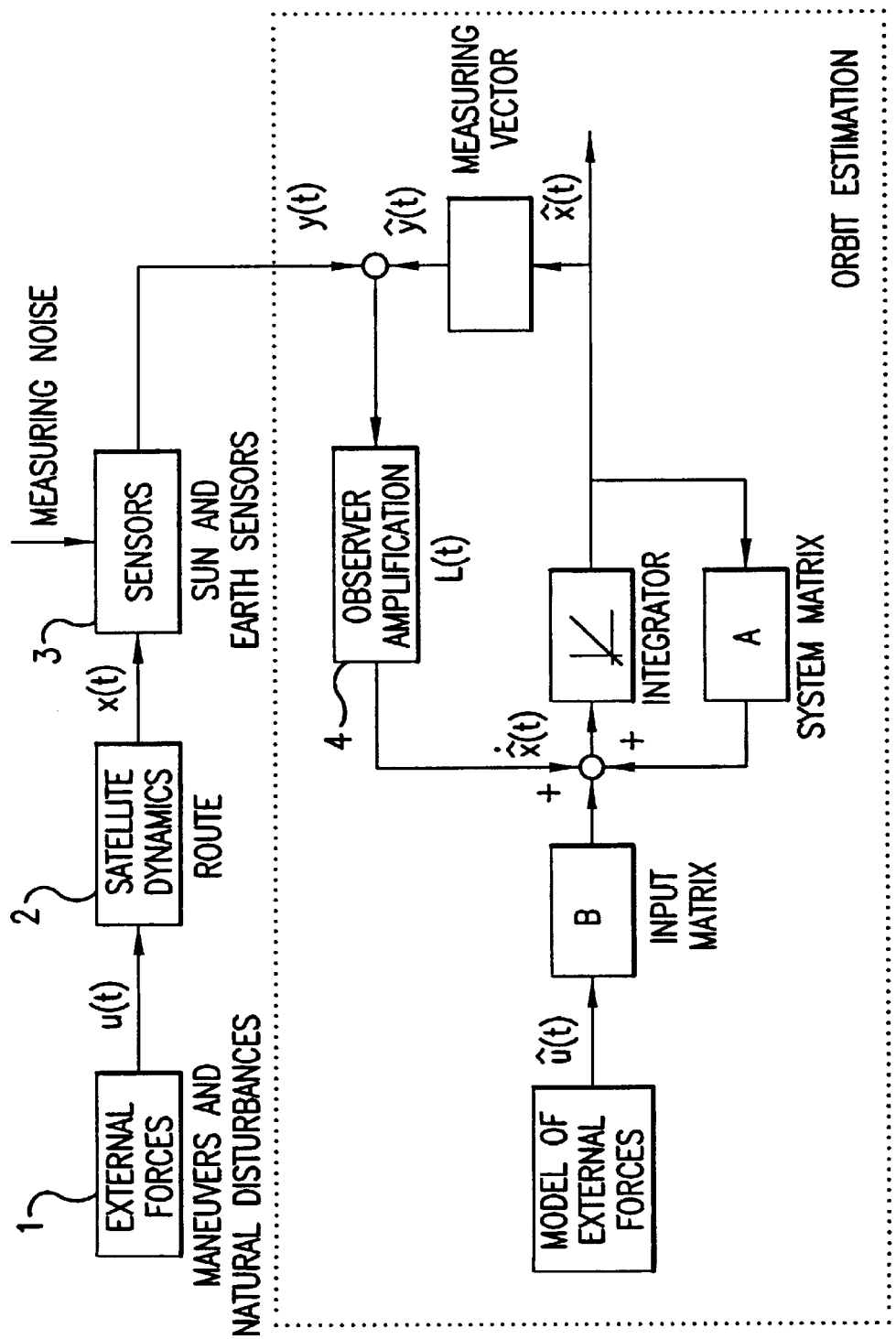
FIG. 3 is a functional block diagram which shows the configuration of an orbit estimation system according to the invention.

FIG. 3 is a functional block diagram which illustrates the structure of an orbit estimation system according to the invention. This system consists of the following sub-blocks:

System Structure

1. Model of the external forces. These include natural disturbances and maneuvers. Natural disturbances are, for example, the three-axis characteristic of the earth, the gravitation of the sun and the moon, the solar pressure, the air resistance, etc. Maneuvers are carried out to hold the position.

2. A model of the orbit dynamics of the satellite given by the matrices A and B or equivalent representations.

3. A model of the measuring information given by the measuring vector c.

4. An amplification vector 1 given by $$\vec{l}(t) = \begin{pmatrix} 0 \\ 0 \\ l_3 \\ l_4 \\ l_5 \\ l_6 \end{pmatrix} \sin(\alpha - \alpha_s) \quad (1.17)$$

The first two components of the (6×1) observer amplification vector l(t) are equal to zero, which corresponds to the pure propagation of the out-of-plane movement. The constant factors $l_i$, i=3(1)6 receive a sinusoidal course with respect to time. By the selection of the $l_i$, i=3(1)6, the transient behavior of the estimation error can be influenced.

Instead of the time-variant observer illustrated in FIG. 3 a Kalman filter can be used for example. However, it is also important here that the filter is used only for one movement (normally in-plane) and the second movement (normally out-of-plane) is propagated.

Calibration

The above-described method for estimating the orbit requires measuring information from the earth sensor and the sun sensor. The two types of measuring information must be mutually coordinated; that is, the relative position of these sensors must be precisely known. However, this is not the case in reality, because of sensor inaccuracies, installation errors of the sensors as well as because of the different installation sites of the sensors on the satellite structure and its thermal deformation. This time-variable inaccuracy must therefore be determined by calibration, and the measurement quantity must be corrected by means of it. A prerequisite for calibration is the knowledge of the satellite orbit. For this purpose, the orbit is measured from the earth station before the calibration. Since inaccuracies due to thermal effects are a function of the direction of incidence of the sun on the satellite, in the case of geostationary satellites, they are subjected to fluctuations with respect to both the time of day and the season.

If the earth sensor is taken as the reference, and the installation directions of the sun sensor measuring heads are considered to have errors, the following applies to the sun vector measurement $s_{bm}$ $$s_{bm} = [E-\delta]s_b \quad (1.18)$$

with a time-dependent rotation δ(t) which is first unknown. Instead of the measuring equation (1.14), the following measuring equation will then be obtained $$y = \underbrace{-e_z^T \tilde{\delta} s_r}_{k(t)} + e_z^T \tilde{e}_x s_r \beta_{hill} + e_z^T \tilde{e}_y s_r \lambda_{hill} \quad (1.19)$$

The first term on the right side is the calibration function, abbreviated k(t), to be determined. It is illustrated here that the satellite orbit (angles β and λ) must be known in order to determine k(t) by means of the equation (1.19). The calibration function k(t) is determined for one orbit, which in the case of a geostationary satellite corresponds to a day. Because of the degradation and the seasonal fluctuations of the thermal deformations, the calibration should be repeated approximately every 3 months.

To determine the course of k(t), data sets with a scanning rate which is as high as possible (at as many support points as possible) are recorded. The recorded data are then filtered (smoothed), and the course of k(t) is approximated, for example, by means of polynomials or spline functions, in order to reduce the extent of the data required for the description of k(t). The determination of k(t) can be carried out either on board the satellite or on the earth.

Overall Method

The overall approach for determining the satellite orbit consists of three alternating steps. By means of the information obtained in operating Phases 1 and 2, orbit correction maneuvers can then be carried out autonomously and optimally with respect to fuel in a third step (Phase 3).

Calibration of the Sensors and Updating of the Orbit Parameters/Satellite Orbit (Phase 1)

For calibrating the sensors and initializing (updating) the orbit parameters (state of the satellite orbit), the satellite orbit is first measured precisely from the earth station. These data are then loaded into the on-board computer by means of a telecommand. The necessary computations for the calibration can be carried out either on earth or in the on-board computer.

Autonomous Orbit Prediction and Orbit Estimation (Phase 2)

Utilizing the error model computed in Phase 1, the in-plane movement of the satellite orbit is estimated as described above, and the out-of-plane movement is propagated.

Autonomous Implementation of the Orbit Correction Maneuvers (Phase 3)

The strategy for implementing orbit correction maneuvers is optimized with respect to the position precision and the fuel consumption of the overall satellite system (including the attitude control). For monitoring the on-board computations, the data of the estimated orbit parameters are transmitted continuously by way of telemetry to the earth station which automatically checks them by means of its own estimations concerning the satellite orbit. In the case of an excessive deviation of the orbit estimated on board from the orbit determined on earth, autonomous implementation of the orbit correction maneuver is stopped by a simple telecommand, and the orbit model on board is then updated by telecommands (Phase 1).

II. Alternative Embodiment Using Gyros

The process described above, uses only a scalar, attitude-independent measurement by the earth/sun sensor arrangement. This measurement is composed of the geographic longitude λ (East/West movement) and the latitude β (North/South movement) of the satellite or their deviation $\lambda_{hill}$, $\beta_{hill}$ from the nominal values (see Equations 1.13–1.15).

$$y = s_{ry}\beta_{hill} - s_{rx}\lambda_{hill} \quad (2.1)$$

$s_{rx}$, $s_{ry}$: See equations 1.9 and 1.10.

Because of the special linking of these quantities in the measuring values and in the orbit dynamics of the satellite, the longitude and the latitude of the satellite cannot be determined simultaneously by means of the measurements. (The system cannot be observed completely).

One of these two quantities must therefore be provided by other means, such as the geographic latitude β. The sensor configuration will then supply direct measurements of the other quantity (such as the geographical longitude λ):

$$m = \underbrace{y - s_{ry}\beta_{hill}}_{\text{known}} = -s_{rx}\lambda_{hill} \quad (2.2)$$

Based on this equation, an observer is now described in the claims by means of which the geographical longitude of the satellite can be determined.

A method is also discussed in the previously described process, for providing the geographic latitude of the satellite. (This was the prerequisite for the validity of the measuring equation 2.2):

Because of the special dynamic characteristics of the North/South movement and of the high quality of the modelling of the disturbances influencing the movement, the geographic latitude of the satellite can be predicted with a very high accuracy (propagation). For this purpose, the geographic latitude must be known only once at the beginning of the autonomous phase (for example, by a measurement from the earth station); additional supporting measurements are not required.

Since a knowledge of the geographic latitude is the prerequisite for the functioning of the observer, the accuracy of the observation is also a function of the accuracy of the initially provided geographic latitude.

The prediction of the geographic latitude by propagation will become less accurate as the time period increases because of the propagation of small initialization errors and modelling inaccuracies. A point in time will occur at which the prediction of the geographic latitude (and thus also the observation of the geographic longitude) will become too inaccurate to use these values for correcting the position. A new initialization of the propagation model will then be required.

The applicability of the process and thus the duration of the autonomy is therefore limited probably to a few weeks. If no other sensors are admitted on board, a subsequent autonomous phase must be started by a new measuring from earth.

It is possible, however, to use gyro measurements to make the required reinitialization independent of the ground. Therefore, the process does not change in principle; however, the gyros permit an autonomous reinitialization on board which extends the duration of the autonomy of the now expanded system (no time limitation).

However, because of the increasing complexity of the system and the inaccuracy of the gyro measurements, this unlimited time must be at the expense of a decreasing accuracy of the determination of the orbit.

Expansion of the Sensor Configuration by Gyros

Gyros, which are installed in the direction of the satellite axes, like the earth and sun sensor, already exist on board the satellite for controlling its attitude. The expansion of this process therefore does not incur rising costs; the process is based on an existing sensor configuration.

The measurements of the earth/sun sensor configuration are still described by the vector equation 1.13:

$$\bar{s}_b - (E - \tilde{\varphi}_{12})\bar{s}_r = (\tilde{e}_x \beta_{hill} + \tilde{e}_y \lambda_{hill} - \tilde{e}_z \psi)\bar{s}_r \quad (2.3)$$

or $$\bar{y} = \begin{pmatrix} s_{ry}\psi + s_{rz}\lambda_{hill} \\ -s_{rx}\psi - s_{rz}\beta_{hill} \\ s_{ry}\beta_{hill} - s_{rx}\lambda_{hill} \end{pmatrix} \quad (2.4)$$

It had previously been required to eliminate the yaw attitude angle $\psi$ from the equations because no information existed concerning this angle. By means of the gyro measurements, the coupling of the roll/yaw dynamics of the satellite can now be utilized:

$$\dot{\Phi} = \omega_0 \cdot \psi + \omega_x$$

$$\dot{\psi} = -\omega_0 \cdot \Phi + \omega_z \quad (2.5)$$

The rates of rotation $\omega_x$ and $\omega_z$ are determined from the gyro measurements according to the following gyro model:

$$\omega_m = \alpha + \delta\omega + n_E$$

$$\delta\dot{\omega} = n_D \quad (2.6)$$

In this case, $\omega_m$ is the measured rate of rotation about the installation axis of the gyro; $\omega$ is the actual rate of rotation; $\delta\omega$ is an unknown gyro-specific drift; and $n_E$ is the electric random noise of the gyro. The unknown drift can be described dynamically by the random drift noise $n_D$.

The roll/yaw dynamics supported by gyro measurements can therefore be represented as follows in the state space:

$$\begin{pmatrix} \dot{\phi} \\ \dot{\psi} \\ \delta\dot{\omega}_x \\ \delta\dot{\omega}_z \end{pmatrix} = \begin{pmatrix} 0 & \omega_0 & -1 & 0 \\ -\omega_0 & 0 & 0 & -1 \\ 0 & 0 & 0 & 0 \\ 0 & 0 & 0 & 0 \end{pmatrix} \begin{pmatrix} \phi \\ \psi \\ \delta\omega_x \\ \delta\omega_z \end{pmatrix} + \begin{pmatrix} {}_x n_E \\ {}_z n_E \\ {}_x n_D \\ {}_z n_D \end{pmatrix} + \begin{pmatrix} {}_x \omega_m \\ {}_z \omega_m \\ 0 \\ 0 \end{pmatrix} \quad (2.7)$$

If, in addition, the second component of the sun sensor measurement (2.4) is used which had not been used in the process described so far, and this is supplemented by the roll angle measurement of the earth sensor, a completely observable 6-dimensional system is obtained:

$$\begin{pmatrix} \dot{\phi} \\ \dot{\psi} \\ \delta\dot{\omega}_x \\ \delta\dot{\omega}_z \\ \dot{\beta}_{hill} \\ \ddot{\beta}_{hill} \end{pmatrix} = \begin{pmatrix} 0 & \omega_0 & -1 & 0 & 0 & 0 \\ -\omega_0 & 0 & 0 & -1 & 0 & 0 \\ 0 & 0 & 0 & 0 & 0 & 0 \\ 0 & 0 & 0 & 0 & 0 & 0 \\ 0 & 0 & 0 & 0 & 0 & 1 \\ 0 & 0 & 0 & 0 & -\omega_0^2 & 0 \end{pmatrix} \begin{pmatrix} \phi \\ \psi \\ \delta\omega_x \\ \delta\omega_z \\ \beta_{hill} \\ \dot{\beta}_{hill} \end{pmatrix} + \quad (2.8)$$

$$\begin{pmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 0 \\ 0 & 0 & 0 & 0 & 1 \end{pmatrix} \begin{pmatrix} {}_x\omega_m + {}_x n_E \\ {}_z\omega_m + {}_z n_E \\ {}_x n_D \\ {}_z n_D \\ f_y \\ ma_{geo} \end{pmatrix}$$

$$\begin{pmatrix} y_1 \\ y_2 \end{pmatrix} = \begin{pmatrix} 1 & 0 & 0 & 0 & 0 & 0 \\ 0 & -s_{rx} & 0 & 0 & -s_{rz} & 0 \end{pmatrix} \begin{pmatrix} \phi \\ \psi \\ \delta\omega_x \\ \delta\omega_z \\ \beta \\ \dot{\beta} \end{pmatrix} + \begin{pmatrix} 1 \\ 1 \end{pmatrix} n_{IRES} \quad (2.9)$$

with $f_y/(m \cdot a_{geo})$ according to Equation 1.8 (the orbit frequency is marked $\omega_0$ here instead of n). $n_{IRES}$ is the random noise of the earth sensor.

Figure 4:
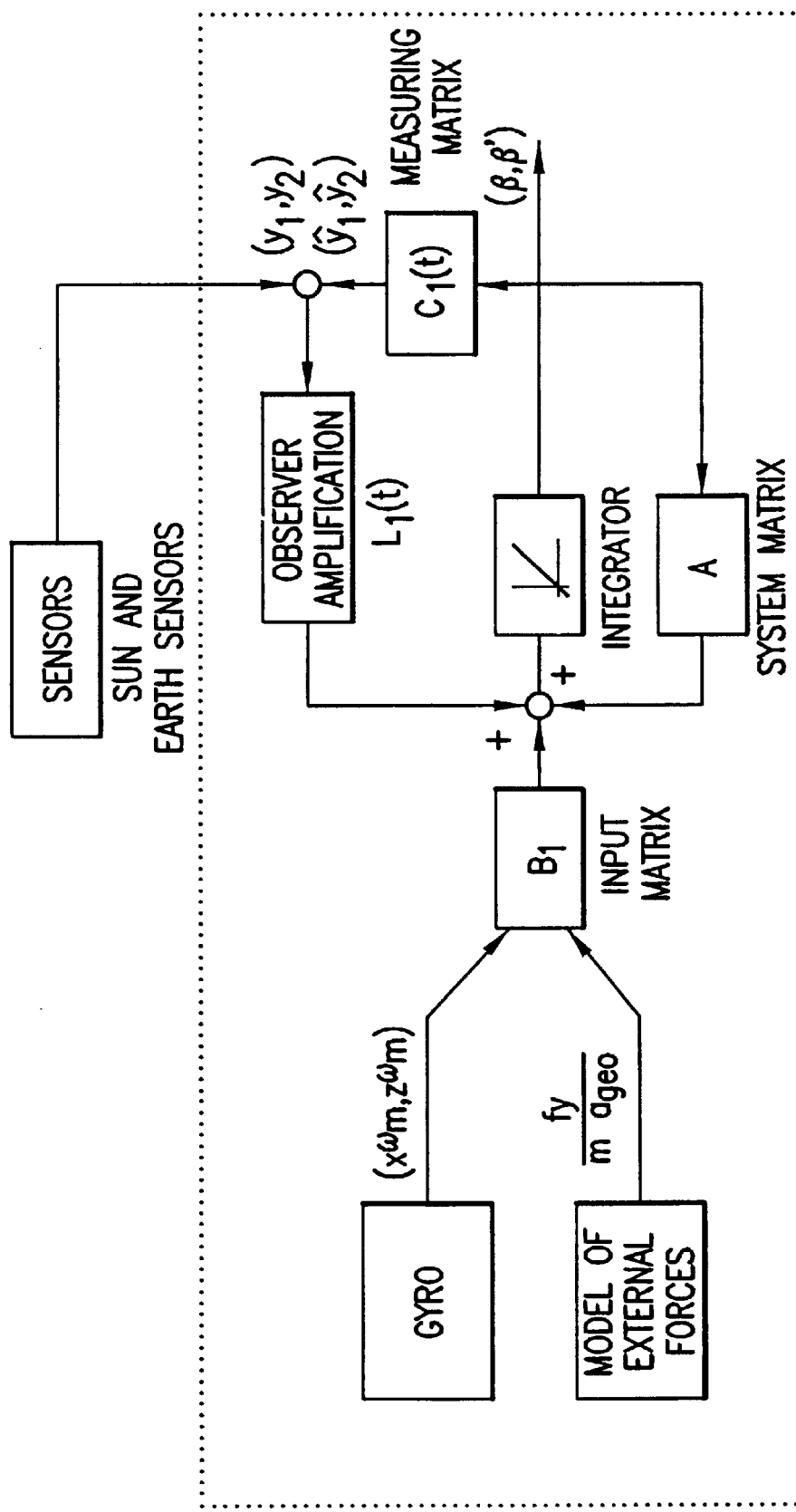
FIG. 4 shows an additional observer for estimating the latitudinal deviation and its time derivative on the basis of additional gyro measurements.

For this system too, an observer according to FIG. 4 or a Kalman filter can be designed which supplies an estimated value for the geographical latitude. This estimated value can be used as the input for the previously used process for observing the geographical longitude.

Concerning the observer illustrated in FIG. 4, the following should also be noted: The system matrix $A_1$ is identical with the matrix assigned to the condition vector on the right side of equation (2.8). This condition vector is six-dimensional and, as components, contains the roll angle $\Phi$, the yaw angle $\psi$, the x-component, the gyro drift $\delta\omega$, the corresponding z-component, the latitudinal deviation $\beta$ of the satellite position as well as its first time derivation. The input matrix $B_1$ is obtained from the matrix assigned to the interference vector situated on the extreme right in Equation (2.8), by the deletion of its third and fourth column, since the statistical quantities (uncorrelated noise) contained in the 2nd and 3rd component of this interference vector are not taken into account in the observer. The measuring matrix $C_1(t)$ is identical with the matrix assigned on the right side of Equation (2.9) to the condition vector situated there. The observer amplification $L_1(t)$ can be selected according to respective expedient criteria familiar to the person skilled in the art.

The observer according to FIG. 4 generates the six-dimensional condition vector indicated in Equation (2.8) at the output at the integrator. The last two components of this condition vector, specifically $\beta$ as well as $\dot{\beta}$, are now fed to the observer according to FIG. 3. They are placed there as initial values of the integrator, specifically naturally for the corresponding first two components of the condition vector $\hat{x}(t)$ to be estimated there. The other initial values for the remaining four components of this condition vector, if they are not known, may be set to zero. This initial inaccuracy is compensated in time, specifically by means of the correction effective by way of the observer amplification $l(t)$ with respect to these components. If no gyro measurements are available, the initial values for $\beta$ as well as its time derivation $\dot{\beta}$ must be set by the earth station.

The vectors occurring in Equation (1.15) next to the two sun vectors are the two earth vectors point from the satellite to the center of the earth, relative to the satellite-fixed system of coordinates (Index b) as well as to the reference system (Index r).

In order to avoid misunderstandings, it should also be pointed out that the component $y_1$ on the left side of Equation (2.9) is not identical with the first component of the vector indicated by Equation (2.4). The term in (2.9) was selected for purely formal reasons. In contrast, the component $Y_2$ from (2.9) is identical with the second component from (2.4); as the quantity y from (1.16) is identical with the third component from (2.4).

The quantity m in Equation (1.4) is the satellite mass.

The quantities $\alpha$ as well as $\alpha_s$ in Equation (1.17) correspond to the following quantities from Equation (1.9): $\alpha=nt$, $\alpha_s=nt_{s0}$.

A an alternative, the estimated value of the latitudinal deviation $\beta$ can be used for reducing the measured value $y(t)$ described in claim 1 so that the resulting measured value, which depends exclusively on the longitudinal deviation $\lambda$, enters into an observer which is based on a condition reduced by the latitudinal deviation and its time derivation.

In this case, the components of the observer in FIG. 3 will change as follows:

Condition $x(t)$: Deletion of the first two components.

Input matrix B: Deletion of the second column and the first and the second line.

Dynamics matrix A: Deletion of the first and second line and column.

Observer amplification $l(t)$: Deletion of the first two components.

Measuring vector $c(t)$: Deletion of the first two components.

Description of the Overall System

The overall system according to this alternative consists of two independent subsystems which are connected by the fact that the output of-System Number 1 is provided as the input of System Number 2:

System Number 1 (see FIG. 4)

is based on gyro measurements about the roll and yaw axis is based on earth sensor measurements about the roll and pitch axis uses 2nd component of the measuring equation 2.4 or 1.13 output: estimation of the geographical latitude $\beta_{hill}$

System Number 2 (see FIG. 3)

is based on earth sensor measurements about the roll and pitch axis uses 3rd component of the measuring equation 2.4 or 1.13 uses the estimation of the geographical latitude $\beta$ from System 1 for the reduction of the measuring equation output: estimation of the geographical longitude $\lambda_{hill}$ System Number 2 corresponds to the previously used process except for the fact that the geographical latitude is provided by a propagator which must be initialized by a measurement from earth.

When implementing this process it may, for reasons of an optimal design of the observers for the subsystems, be useful to mathematically combine the systems to a single large system and to prepare a complete design for the observer. This does not change the principal architecture of the process.

Effects of the Modifications on the Position Accuracy and the Duration of the Autonomy Because of the increase of the complexity of the system combined with the inaccuracy of the earth sensor and gyro measurements, the accuracy of the orbit determination will decrease in comparison to the. propagated North/South movement. In this case, the estimation based on earth/sun sensor/gyro measurements must compete with the measuring of the geographic latitude in earth stations. This accuracy cannot be achieved by means of this sensor configuration.

The introduced modified process is therefore less accurate than the one previously known but permits an extension of the duration of the autonomy without an intervention from the earth and virtually without any time limit.

Calibration

Earth/Sun Sensor Measurement:

The principle of the calibration does not change. As described previously, deterministic errors in the sensor orientation (constant errors and periodically time-dependent errors) by way of an additive error $k(t)$ affect the scalar measurable quantities of the earth/sun sensor configuration.

Therefore, a $k_{syst1}(t)$ exists for. the earth/sun sensor measurement from System 1, and a $k_{syst2}(t)$ exists for the measurement from System 2 which are composed of the influences of the orientation errors about the satellite axes and contaminate the exact measuring values.

As described above, these functions can be determined directly by measuring the satellite position from earth. Since the error functions $k_{sys}(t)$ can be reproduced over several days, they can be stored on board the satellite. During an autonomous phase, the measuring values $y_i(t)$ can be corrected by means of these functions by a simple subtraction $y_{cal}(t)=y_i(t)-y_{sys}(t)$.

Gyro Measurement

The errors of the gyro measurements (gyro drifts) are already contained in the gyro model 2.6 and in the dynamics 2.8 and are therefore taken into account as a state in the observer. The gyros therefore do not have to be calibrated a priori.

Summary of Alternative Embodiment

The expansion introduced here with respect to the first embodiment should be considered only as an alternative expansion. This first embodiment is an autonomous process which is characterized by a very high accuracy and reliability. However, this may be at the expense of contact with the earth station, thus by an interruption of the autonomous phase, which is reflected mainly in Phase 3.

Certain situations or application may favor an increase of the autonomous periods and thus a long-term complete independence from the earth stations, with a reduced accuracy of the orbit determination (enlarged satellite window). Military missions or "save mode" mission sections, for example, are conceivable in which the contact to earth stations is completely broken off.

These performance characteristics can be achieved by a modification in Phase 2 of the overall process. The out-of-plane movement is not propagated exclusively but is estimated in an observer which is supported by gyro measurements and earth/sun sensor measurements and requires no advance information concerning the position of the satellite.

The (non-autonomous) measuring of the geographic latitude of the satellite for initializing the propagator from an earth station is therefore replaced by the autonomous observation of the latitude by means of earth/sun sensor/gyro measurements. As a result, the monitoring and the intervention by the earth station can be eliminated in Phase 3.

Although the invention has been described and illustrated in detail, it is to be clearly understood that the same is by way of illustration and example, and is not to be taken by way of limitation. The spirit and scope of the present invention are to be limited only by the terms. of the appended claims.

What is claimed is:

1. Method for the autonomous on-board determination of the position of an earth orbitting satellite having a biaxially measuring earth sensor and a biaxially measuring sun sensor arrangement for determining directions of the earth and sun relative to a satellite-fixed system of coordinates, said method comprising:

using an observer, which models orbit dynamics of the satellite as well as disturbance and maneuver accelerations affecting it, to estimate a state vector $\hat{x}(t)$ whose components comprise the deviations $\lambda$, $\beta$, $r$ of a momentary orbit position of the satellite relative to a desired orbit position in three mutually orthogonal coordinate directions x, y, z of an orbit-related system of coordinates, as well as their time derivatives, two of the deviations $\lambda$, $r$ being situated in an orbit plane of the satellite and the third $\beta$ being oriented perpendicularly to the orbit plane;

inputting to the observer a measurement quantity y(t) representing the difference between the nominal angle between directions of the earth and the sun and the corresponding angle derived from the sensor measurement; and correcting only components of the state vector $\hat{x}(t)$ which are assigned to the deviations situated in the orbit plane, using the input measurement quantity y(t).

2. Method according to claim 1, comprising further steps for taking into account inaccuracies in relative orientation of the sensors:

measuring deviations $\beta$, $\lambda$ from an earth station;

computing a value for y(t) using the measured deviations $\beta$, $\lambda$; and correcting the measurement quantity y(t) by means of a calibrating function k(t) formed as a difference between a real measurement quantity y(t) and the corresponding computed y(t).

3. Method according to claim 1 further comprising the steps of:

by means of gyro measurements, using coupling of the roll-yaw kinematics of the satellite by way of its orbiting frequency;

using an additional observer, which models the roll-yaw kinematics, the gyro action as well as the orbit dynamics perpendicular to the orbit plane, for estimating a condition vector whose components are formed by the roll and yaw angle of the satellite, the roll and yaw components, the gyro drift as well as the latitudinal deviaton of the satellite position and its time derivation; and feeding into the observer measured values obtained from the sensor and gyro measurements.

4. Method according to claim 3, wherein the estimated values for the latitudinal deviation $\beta$ and its time derivation are fed into the observer for estimating the condition vector x(t) and are used there for setting the initial values of an integrator receiving the time derivation of this condition vector.

* * * * *